United States Patent
Sarwer et al.

(10) Patent No.: US 10,893,272 B2
(45) Date of Patent: Jan. 12, 2021

(54) IMAGE BLOCK CODING BASED ON PIXEL-DOMAIN PRE-PROCESSING OPERATIONS ON IMAGE BLOCK

(71) Applicant: SONY CORPORATION, Tokyo (JP)

(72) Inventors: Mohammed Golam Sarwer, San Jose, CA (US); Ali Tabatabai, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 108 days.

(21) Appl. No.: 16/260,193

(22) Filed: Jan. 29, 2019

(65) Prior Publication Data
US 2020/0244960 A1 Jul. 30, 2020

(51) Int. Cl.
*H04N 19/124* (2014.01)
*H04N 19/12* (2014.01)
*H04N 19/176* (2014.01)
*H04N 19/186* (2014.01)
*H04N 19/625* (2014.01)

(52) U.S. Cl.
CPC ........... *H04N 19/124* (2014.11); *H04N 19/12* (2014.11); *H04N 19/176* (2014.11); *H04N 19/186* (2014.11); *H04N 19/625* (2014.11)

(58) Field of Classification Search
None
See application file for complete search history.

(56) References Cited

U.S. PATENT DOCUMENTS

| 6,192,081 | B1 | 2/2001 | Chiang et al. |
| 7,436,890 | B2 | 10/2008 | Takagi et al. |
| 9,521,410 | B2 | 12/2016 | Seregin et al. |
| 2012/0195364 | A1 | 8/2012 | Yi et al. |
| 2012/0207398 | A1* | 8/2012 | Shimauchi ............. G06T 9/007 382/233 |
| 2017/0201769 | A1* | 7/2017 | Chon ................... H04N 19/147 |

FOREIGN PATENT DOCUMENTS

JP 10-136361 A 5/1998

* cited by examiner

*Primary Examiner* — Stuart D Bennett
(74) *Attorney, Agent, or Firm* — Chip Law Group

(57) ABSTRACT

Embedded Codec (EBC) circuitry for image block coding based on pixel-domain pre-processing operations on image block is provided. The EBC circuitry includes memory that stores a first image block and encoder circuitry that computes a first sum of absolute differences (SAD) from a first prediction block of row-wise residual values and a second SAD from a second prediction block of column-wise residual values in pixel-domain. The encoder circuitry selects a residual prediction type from a set of residual prediction types as an optimal residual prediction type and a set of quantization parameters as optimal quantization parameters for each of a first encoding mode and a second encoding mode. The encoder circuitry generates a set of bit-streams of encoded first image block in the first encoding mode and the second encoding mode, respectively, based on the selected residual prediction type and the selected set of quantization parameters.

24 Claims, 6 Drawing Sheets

IMAGE BLOCK CODING BASED ON PIXEL-DOMAIN PRE-PROCESSING OPERATIONS ON IMAGE BLOCK

CROSS-REFERENCE TO RELATED APPLICATIONS/INCORPORATION BY REFERENCE

None.

FIELD

Various embodiments of the disclosure relate to image and video compression and decompression technology in embedded codec circuitry. More specifically, various embodiments of the disclosure relate to an embedded codec (EBC) circuitry and method for image block coding based on pixel-domain pre-processing operations on image block.

BACKGROUND

Recent advancements in imaging technologies for image compression has led to an increase in demand for on-chip codecs in image capturing and display devices that can store images with different resolutions (e.g., Full High Definition (HD) 4K resolution, and 8K resolution), without having a significant degradation in visual quality and/or an impact on memory usage. Typically, conventional image encoding circuitry may be configured to encode an image block by different coding schemes and further fully reconstruct different image blocks from multiple bit-streams of the encoded image block. Such operations may be performed in order to determine an optimal mode to encode the image block such that a reconstructed image block from the encoded image block has minimal compression artifacts. The reconstructed image blocks may be compared with the original image block to select an optimal coding mode. The vicious cycle of repeated encoding, reconstruction, and comparison of each image block to find optimal coding mode may lead to utilization of excess computing resources, memory resources, and further cause delay in encoding operations of the image block.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An embedded codec (EBC) circuitry and method for image block coding based on pixel-domain pre-processing operations on image block are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various embodiments of the present disclosure may be found in a method and embedded codec (EBC) circuitry for image block coding based on pixel-domain pre-processing operations on image block. The disclosed EBC circuitry provides a solution to select a best (i.e., an optimal) mode to encode an image blocks without a full reconstruction of image blocks from a bit-stream obtained after a transform-domain coding stage of the image block. As conventional techniques have to reconstruct the entire image block to select the best mode to encode an image block, the disclosed EBC circuitry determines the best mode to encode the image block in a pixel domain pre-processing stage (prior to the transform-domain coding stage) of the original image block. The disclosed EBC circuitry also addresses selection of optimal quantization parameter values and residual prediction types (e.g., DC only or All-frequency residuals) in the pixel domain pre-processing stage. Thus, the disclosed EBC circuitry selects the best mode while still maintaining the visually lossless image quality of the image block. The pixel domain pre-processing stage enables minimum and efficient use of computing resources and memory resources to perform encoding operations on different image blocks in a significantly faster processing time than conventional technologies.

Figure 1:
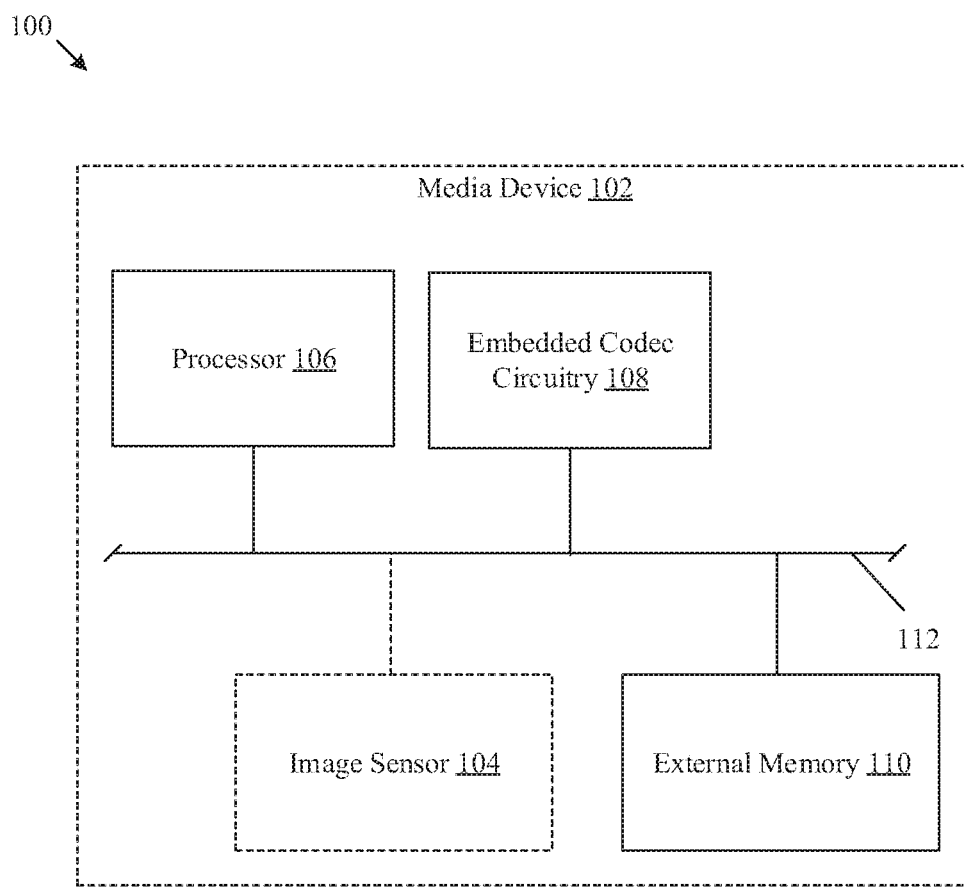
FIG. 1 is a block diagram that illustrates an exemplary media device with an embedded codec (EBC) circuitry and other circuitries for image block coding based on pixel-domain pre-processing operations on image block, in accordance with an embodiment of the disclosure.

FIG. 1 is a block diagram that illustrates an exemplary media device with an embedded codec (EBC) circuitry and other circuitries for image block coding based on pixel-domain pre-processing operations on image block, in accordance with an embodiment of the disclosure. With reference to FIG. 1, there is shown a media device 102 that includes a processor 106, an EBC circuitry 108, and an external memory 110. In some embodiments, an image sensor 104 may be interfaced with the processor 106, the EBC circuitry 108, and the external memory 110. There is further shown a system bus 112 that interconnects the image sensor 104, the processor 106, the EBC circuitry 108, and the external memory 110.

The media device 102 may comprise suitable logic, circuitry, and interfaces that may be configured to store uncompressed raw images and/or videos as encoded (i.e. compressed) images and/or videos in the external memory 110. The media device 102 may be further configured to manage encoding as well as decoding of media content (for example, encoded images and/or videos) and further playback of the decoded media content at the media device 102. The media device 102 may include a dedicated on-chip codec circuitry (such as the EBC circuitry 108), and the external memory 110 for storage of images (raw uncompressed or encoded), along with other computational circuitries for an offline (without network) encoding of the media content at the media device 102. In some embodiments, the media device 102 may also include one or more image sensors (such as the image sensor 104) to capture images in a raw image file format, which is an uncompressed file format. In such cases, the captured image may be encoded by the EBC circuitry 108 of the media device 102. Examples of the media device 102 may include, but are not limited to, a digital camera, a portable communication device (e.g. laptops, smartphones, tablets, phablets, smart watches, smart glasses, etc.), a media server, a workstation, a desktop computer, and augmented reality/Virtual Reality/Mixed Reality (AR/VR/MR) devices.

Although not shown in FIG. 1, the media device 102 may also include a network interface that may be configured to manage sharing of encoded and/or raw uncompressed images and/or videos with other peripheral or peer-connected devices, through a communication network (also not shown). The detailed description of the network interface and the communication network has been omitted from the present disclosure for the sake of brevity.

The image sensor 104 may comprise suitable logic, circuitry, and interfaces that may be configured to capture a raw uncompressed image or a sequence of raw uncompressed images of a scene in a field-of-view (FOV) of the image sensor 104. The image sensor 104 may be implemented as an active pixel sensor, such as a complementary-metal-oxide semiconductor (CMOS) sensor. In such implementation, the image sensor 104 may be configured to execute progressive scan (line-by-line) of each row or column of pixels (one dimensional (1D) pixel-array or 1D image block) on a sensor core of the CMOS sensor. The progressive scan may be a vertical scan (column wise) or a horizontal scan (row wise). In some embodiments, instead of an active pixel sensor, the image sensor 104 may be implemented as one of a passive pixel sensor (such as a charged coupled device (CCD) sensor, an oversampled binary image sensor, a planar Fourier capture array (PFCA), a back-illuminated (BSI or BI) sensor, and the like. Although not shown, the image sensor 104 may also include a specialized microprocessor (or a microcontroller) that is configured to operate in accordance with image data from the image sensor 104, a graphic processing unit (GPU) to process images stored in a frame buffer, and/or a memory integrated with the image sensor 104.

The processor 106 may comprise suitable logic, circuitry, and interfaces that may be configured to execute a set of instructions stored in a dedicated memory (e.g., the external memory 110 or an on-chip memory in the EBC circuitry 108). The processor 106 may be implemented based on a number of processor technologies known in the art. Examples of the processor 106 may include, but are not limited to, a Graphical Processing Unit (GPU), a co-processor (such as a specialized image co-processor) for a processor, a specialized digital signal processor, a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor.

The EBC circuitry 108 may comprise suitable logic, circuitry, and interfaces that may be configured to encode a first image block (e.g., an 8×4 or a 16×8 image block as per a specific compression factor) based on a specific coding mode selected based on pixel-domain pre-processing operations on the first image block. The EBC circuitry 108 may be further configured to decode the encoded first image block, in response to instructions received at the EBC circuitry 108. The first image block may be part of an input image frame (i.e. a raw uncompressed image frame) or a pixel array (row or column) retrieved directly from a read out register of the image sensor 104, following a row-wise or a column-wise scan by the image sensor 104. The EBC circuitry 108 may further manage storage of a bit-stream of the encoded first image block in the external memory 110 or may manage transfer of the bit-stream of encoded first image block to other media devices via dedicated communication networks.

The EBC circuitry 108 may be implemented as a specialized hardware encoder/decoder that interfaces with the other computational circuitries of the media device 102. In such implementation, the EBC circuitry 108 may be associated with a specific form factor on a specific computational circuitry. Examples of the specific computational circuitry may include, but are not limited to, a field programmable gate array (FPGA), programmable logic devices (PLDs), an application specific integrated circuit (ASIC), a programmable ASIC (PL-ASIC), application specific integrated parts (ASSPs), and a System-on-Chip (SOC) based on standard microprocessors (MPUs) or digital signal processors (DSPs). In accordance with another embodiment, the EBC circuitry 108 may be also interfaced with a graphical processing unit (GPU) to parallelize operations of the EBC circuitry 108. In accordance with yet another embodiment, the EBC circuitry 108 may be implemented as a combination of programmable instructions stored in a memory and logical units (or programmable logic units) on a hardware circuitry of the media device 102.

The external memory 110 may comprise suitable logic, circuitry, and interfaces that may be configured to store an input image frame (uncompressed raw or encoded) or a sequence of input images. The external memory 110 may be further configured to act as an image buffer to store raw uncompressed image blocks retrieved from the image sensor 104. Additionally, the external memory 110 may store instructions associated with sequential encoding/decoding scheme (which corresponds to optimal coding modes) that may be selected based on pixel-domain pre-processing operations on an image block. In an exemplary embodiment, the external memory 110 may be dynamic random access memory (DRAM) circuits that may be externally interfaced with the EBC circuitry 108. In another exemplary embodiment, the external memory 110 may be static random access memory (SRAM) circuits that may be externally interfaced with the EBC circuitry 108. Further examples of implementation of the external memory 110 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

Although not shown in FIG. 1, the media device 102 may further include a video codec that may be compatible and support known codec standards that may include Advanced Video Codec (AVC)/Media Experts Group (MPEG-4/AVC) or H.264, MPEG-4/HEVC or H.265, and the like. Additionally, the video codec may be supported by other codec libraries that may include FFmpeg, Xvid, DIVx, VP1-9, Windows Media Codec, FFays, and the like.

The system bus 112 may be a hardware bus that may include a set of data channels (or conductive paths) to different components of the media device 102. Alternatively stated, the system bus 112 may interconnect at least data ports, address ports, and control signal ports of different components of the media device 102. For example, the system bus 112 may interconnect the image sensor 104, the processor 106, the EBC circuitry 108, the external memory 110, and other circuitries to each other. The system bus 112 may be configured to facilitate a serial data communication or parallelized data communication between different components on-board the media device 102. Examples of the system bus 112 may include an 8-bit parallel single system bus, a 16-bit parallel single system bus, a 32-bit parallel single system bus, a 64-bit parallel single system bus, a serial data bus, and the like.

In operation, a plurality of image blocks (e.g., 2D image blocks) of an input image frame may be received by the external memory 110 of the media device 102. In some embodiments, a first image block may be retrieved from a plurality of image blocks sequentially from an on-chip image sensor (such as the image sensor 104) or a camera device that be connected to the media device 102. In other embodiments, a plurality of image blocks may be retrieved from a logical partition of an uncompressed raw image stored in a persistent storage of the media device 102 or received externally from other media storage devices, such as cameras, data servers, etc.

In accordance with an embodiment, the EBC circuitry 108 may be configured to receive the first image block from the plurality of image blocks sequentially from the external memory 110 or the image sensor 104. The media device 102 may be further configured to store the first image block in a first storage space of a memory, such as the external memory 110, of the media device 102. The EBC circuitry 108 may be configured to execute a sequential encoding scheme on the first image block to generate a bit-stream of encoded first image block. However, in order to apply the sequential encoding scheme, an optimal encoding mode may be determined in pixel-domain as part of a pre-processing operation prior to actual transform-domain encoding operation on the first image block. The optimal encoding mode may be determined without a reconstruction of encoded first image block by different encoding modes, as implemented in conventional techniques. Pixel domain Sum of Absolute Differences (SAD) requires hardware inconvenient inverse transform operation. However, the disclosed methods are easy to implement in hardware as reconstruction of each image block is not required.

In accordance with an embodiment, the EBC circuitry 108 may be configured to partition the input image frame into a plurality of image blocks. Each image block of the plurality of image blocks may include a plurality of pixel values. The size of each image block may be based on a pre-determined value, such as "8×4 pixels" or "16×4 pixels". Each pixel in each image block may be further represented by a bit-depth, such as a combination of eight bits. The EBC circuitry 108 may be further configured to execute a pre-processing operation on the first image block of the input image frame, in pixel-domain. The pre-processing operation may be executed to determine an encoding mode among a set of encoding modes, where the determined encoding mode may be utilized to encode the first image block with a required bit-depth. The set of encoding modes may include a first encoding mode and a second encoding mode. The first encoding mode and the second encoding mode may correspond to a first sequential encoding scheme and a second sequential encoding scheme respectively. Each sequential encoding scheme of the first sequential encoding scheme and the second sequential encoding scheme may include a sequence of operations such as a forward transform operation, a quantization operation, a residual prediction operation, a DPCM operation, and an entropy coding operation. Here, an application of forward transform may correspond to an application a one dimensional row Discrete Cosine Transform (1D row DCT) on each row of the first image block or an application of the 1D column DCT on each column of the first image block to generate a plurality of transform coefficients.

In some embodiments, the type of forward transform may be based on a family of sinusoidal unitary transforms (that includes a family of orthonormal bases or eigenvectors). Examples of the forward transform may include, but are not limited to, type I-VIII DCT, type I-VIII Discrete Sine Transform (DST), Discrete Wavelet Transform (DWT), and a Dual-Tree Complex Wavelet Transform (DCWT). Similarly, the entropy coding scheme may be a variable length coding (VLC) scheme or one of: a context adaptive variable length coding (CAVLC) scheme or a context adaptive binary arithmetic coding (CABAC) scheme. Examples of the VLC scheme may include, but are not limited to, Lempel-Ziv coding, Huffman coding, arithmetic coding, exp-Golomb coding, Golomb coding, and progressive-Golomb coding.

In the pre-processing operation, the EBC circuitry 108 may be configured to generate a first prediction block based on a row-wise application of a residual prediction scheme on the first image block. Similarly, the EBC circuitry 108 may be further configured to generate a second prediction block based on a column-wise application of the residual prediction scheme on the first image block. The residual prediction scheme may be at least one of: a differential pulse code modulation (DPCM) scheme, an adaptive DPCM scheme, or a PCM scheme. The EBC circuitry 108 may be further configured to compute different sum of absolute differences (SAD) values in the pixel-domain from different residual prediction values of the first image block. More specifically, the EBC circuitry 108 may be configured to compute a first SAD from the first prediction block of row-wise residual values and the second SAD from the second prediction block of column-wise residual values in the pixel-domain. The first SAD and the second SAD may provide a measure of spatial variations in pixel values of the first image block when scanned row-wise and column-wise, respectively. In some embodiments, instead of SAD, other similarity measures between image blocks, for example, sum of squared difference (SSD), may be used without limiting the scope of the disclosure.

The EBC circuitry 108 may be further configured to select a residual prediction type from among a set of residual prediction types, as a parameter for a residual prediction scheme for each encoding mode of a set of encoding modes. For example, if the residual prediction scheme is DPCM scheme, the residual prediction type may be selected as either an all frequency DPCM or a Direct Current (DC) only DPCM. Alternatively stated, it may be determined whether to execute the DPCM scheme on all the frequency components (DC and Alternating Current (AC)) levels or only the DC levels of the first image block in the first encoding mode and the second encoding mode.

The EBC circuitry 108 may be further configured to select a set of quantization parameters as optimal quantization parameters for each of the first encoding mode and the second encoding mode, based on the computed first SAD and the computed second SAD. The pre-processing operation has been further described in detail, for example, with reference to FIGS. 2, 3A and 3B.

In the first encoding mode and the second encoding mode, based on the selected residual prediction type and the selected set of quantization parameters, the EBC circuitry 108 may be configured to separately encode the first image block to generate a set of bit-streams of encoded first image block. Each bit-stream from the set of bit-streams may correspond to a different sequential encoding scheme of a set of sequential encoding schemes. Alternatively stated, each bit-stream may correspond to a different compression mode, where different parameters of individual schemes and operations may vary. For example, the first encoding mode may correspond to a first sequential encoding scheme, which may include a sequence of 1D row DCT, a quantization with selected quantization parameters, a residual prediction scheme (with the selected residual prediction type), and an entropy coding scheme. The second encoding mode may correspond to a second sequential encoding scheme, which may include a sequence of 1D column DCT, a quantization with selected quantization parameters, a residual prediction scheme (with the selected residual prediction type), and an entropy coding scheme.

The EBC circuitry 108 may be configured to compute a bit-loss value associated with each of the set of bit-streams. In accordance with an embodiment, the bit-loss value may be computed from a bit-coverage value for each of the set of bit-streams. In such a case, the bit-loss value may be a difference in a total number of bits for a bit-stream minus the bit-coverage value for the corresponding bit-stream. The bit-coverage value may represent a number of bits for all samples in the first image block encoded losslessly in the first encoding mode or the second encoding mode. Similarly, the bit-loss value may represent a number of bits in a bit-stream corresponding to a set of samples of the first image block encoded in a lossy manner. Thus, both the bit-coverage value and the bit-loss value may represent a measure of coding quality, which is used to decide an optimal encoding mode from the first encoding mode and the second encoding mode. The EBC circuitry 108 may be configured to identify a bit-stream from the set of bit-streams that has a minimum bit-loss value in comparison to that of other bit-streams in the set of bit-streams. Alternatively stated, from the set of bit-streams, the identified bit-stream is one having least number of samples (corresponding to the first image block) encoded in a lossy manner. The identified bit-stream may correspond to a preferred encoding mode, selected from one of the first encoding mode or the second encoding mode. Thus, the EBC circuitry 108 may be configured to select one of the first encoding mode or the second encoding mode as an optimum encoding mode, based on the computation of the bit-loss values associated with each of the set of bit-streams.

A conventional encoding circuitry may have to fully reconstruct a set of image blocks from different bit-streams of the first image block encoded based on different sequential encoding schemes. Thus, in order to fully reconstruct, the conventional encoding circuitry may have to decode the entire set of different bit-streams and compare each of the fully reconstructed first set of image blocks with the first image block. This may be done to identify an encoding mode as an optimal encoding mode that may cause minimum compression artifacts, maximum compression factor, and a reduction in overall bit-depth for the encoded first image block. As full reconstruction of the first set of image blocks may be a computationally resource intensive process, which may increase computation time (inclusive of encoding/decoding time), and further requires more memory for processing. In contrast, the EBC circuitry 108 may identify the optimum encoding mode based on computation of the bit-loss values associated with each of the plurality of compressed bit streams. The optimum encoding mode may be selected without the need to fully reconstruct different image blocks from different bit-streams of the first image block. Pixel domain Sum of Absolute Differences (SAD) typically requires hardware inconvenient inverse transform operation. However, the disclosed EBC circuitry 108 is easy to implement in hardware as full reconstruction of blocks is not required due to the pre-processing stage.

The EBC circuitry 108 may be further configured to encode the first image block to generate a bit-stream of encoded first image block by application of an optimum sequential encoding scheme that corresponds to the optimum encoding mode. The media device 102 may be configured to store the bit-stream as a stream of compressed first image block in a storage space that is smaller than a space required to store the first image block.

In accordance with an embodiment, an EBC decoder circuitry (not shown in FIG. 1) of the EBC circuitry 108 may be configured to pre-store different coding tables, for example, coding tables for entropy coding schemes and quantization tables. Therefore, the bit-stream of encoded first image block may need not include different coding tables and quantization tables. In accordance with an embodiment, the EBC circuitry 108 may be configured to generate a bit-stream of encoded image block such that the bit-stream is decodable by external decoders that may utilize different decoding schemes to decode the bit-stream of encoded first image block. In such a case, the EBC circuitry 108 may be configured to add different coding tables (e.g., coding tables for entropy coding schemes) and quantization tables, in header information or a different meta-stream associated with the bit-stream of encoded first image block. By addition of such custom tables and quantization tables in the bit-stream, the output of the EBC circuitry 108 may be decodable by other decoder circuitries.

In accordance with an embodiment, the bit-stream of encoded first image block may be stored as part of an input image (such as, a 2D image) in the memory, such as the external memory 110 or an on-chip memory in the EBC circuitry 108. The bit-stream of encoded first image block may have multiple implementations in different applications. In one exemplary implementation, the processor 106 may be configured to transfer the bit-stream of encoded first image block, via the system bus 112, to a frame buffer (or a frame store) of a display circuitry (e.g., a video card) communicatively coupled (or interfaced) with the system bus 112 of the media device 102. The frame buffer may act as a compressed frame buffer for the display circuitry. The media device 102 (or a decoding circuitry (not shown in FIG. 1) may decode and further utilize the bit-stream of encoded first image block to display a patch of image onto a display screen of the media device 102. In another exemplary implementation, the processor 106 may be configured to transfer the bit-stream of encoded first image block, via the system bus 112, to a decoder buffer, such as a decoder picture buffer (DPB) of a video decoder, a buffer memory for an image decoder, or a coded picture buffer (CPB) of a video codec, in the media device 102.

In an exemplary implementation, the media device 102 may be a camera, such as a digital video camera or a digital image camera, and the bit-stream of encoded first image block may correspond to a 2D array of pixel values that are directly received from a CMOS sensor in the camera. In a specific scenario, the EBC circuitry 108 may be implemented in the CMOS sensor circuitry. The detailed operation of EBC circuitry 108 has been further described in detail, for example in FIGS. 2, 3A and 3B.

Figure 2:
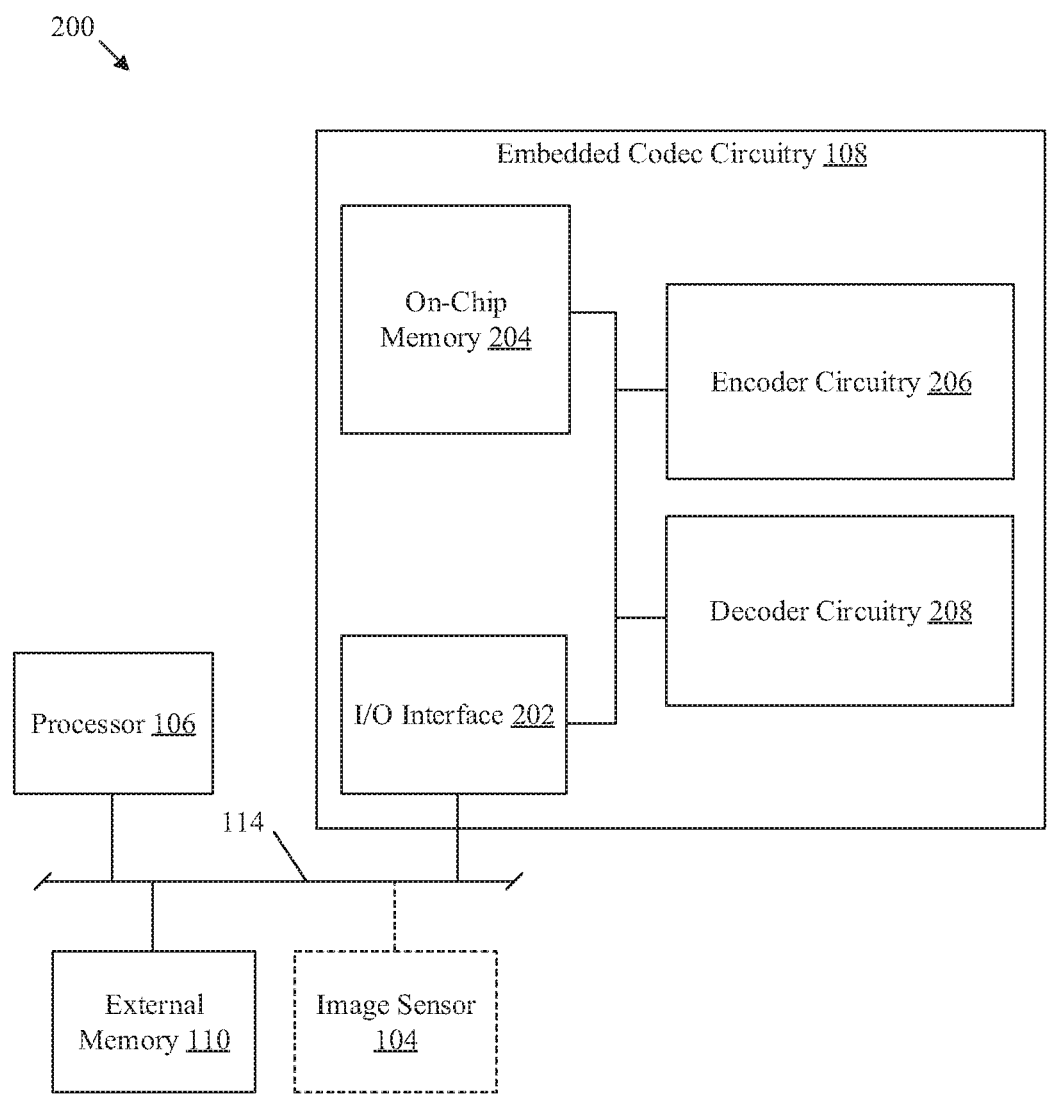
FIG. 2 is a block diagram that illustrates the EBC circuitry of FIG. 1 with various peripheral components for image block coding based on pixel-domain pre-processing operations on image block, in accordance with an embodiment of the disclosure.

FIG. 2 is a block diagram that illustrates the EBC circuitry of FIG. 1 with various peripheral components for image block coding based on pixel-domain pre-processing operations on image block, in accordance with an embodiment of the disclosure. FIG. 2 is explained in conjunction with elements from FIG. 1. With reference to FIG. 2, there is shown a block diagram 200 of the EBC circuitry 108. The EBC circuitry 108 may include an Input/output (I/O) interface 202, an on-chip memory 204, an encoder circuitry 206, and a decoder circuitry 208. In the block diagram 200, there is also shown the image sensor 104, the processor 106, and the external memory 110 communicatively coupled to the EBC circuitry 108, via the system bus 112. In some embodiments, the processor 106 and the external memory 110 may be implemented inside the EBC circuitry 108, without deviation from the scope of the disclosure.

The I/O interface 202 may comprise suitable logic, circuitry, and interfaces that may be configured to manage a plurality of I/O ports to facilitate exchange of communication data from other peripheral circuitries, via the system bus 112, for example, the external memory 110, the processor 106, or the image sensor 104. The communication data may include a bit-stream of the encoded image block, control signals, CPU instructions, and the like. The configuration of the I/O ports may depend on a specification of the EBC circuitry 108, for example, physical I/O pins in an ASIC, FPGA or a SoC chip.

The on-chip memory 204 may comprise suitable logic, circuitry, and interfaces that may be configured to store different operational data (e.g., transform domain data, residual levels, quantization levels, entropy coded bits, etc.) that may be utilized by different components of the EBC circuitry 108 to encode a plurality of image blocks of an input image frame. Examples of the operational data that the on-chip memory 204 may be configured to store may include, but are not limited to, a bit-stream of encoded first image block, transform-domain data, quantized-transformed levels, quantized-transformed residual levels, and 1D/2D image blocks. The on-chip memory 204 may be implemented as a specific memory designed with a defined memory specification, such as R/W speed, memory size, fabrication factors, and the like. Examples of the on-chip memory 204 may include, but are not limited to, static random access memory (SRAM), dynamic access memory (DRAM), and Static Dynamic RAM (SD-RAM).

The encoder circuitry 206 may comprise suitable logic, circuitry, and interfaces that may be configured to generate a bit-stream of encoded first image block by application of an optimal sequential encoding scheme, stored in a memory, such as the on-chip memory 204 or the external memory 110. The optimal sequential encoding scheme may correspond to an optimal encoding mode, which may be selected based on pixel-domain pre-processing operations on the first image block. The encoder circuitry 206 may be optimized to reduce a number of bits (i.e. the bit-depth in bits per sample (bps)) that may be used to encode a block of quantized-transformed residual levels of the first image block in an encoding operation. The reduction in the bit-depth to a preferred value may cause an improvement in a compaction efficiency and/or a compression factor for the first image block. In some embodiments, the encoder circuitry 206 may be a hardware encoder chip that may be implemented based on one of ASIC, programmable logic devices (PLDs), SOC, FPGA, digital signal processors (DSPs) or other specialized circuitries. In other embodiments, the encoder circuitry 206 may be implemented as a combination of hardware and stored set of instructions in the on-chip memory 204 (for example, instructions based on Very High Speed Integrated Circuits (VHSIC) Hardware Description Language (VHDL) or HDL logic.

The decoder circuitry 208 may comprise suitable logic, circuitry, and interfaces that may be configured to decode a bit-stream of encoded first image block based on header information in the bit-stream. In decoding operation, the bit-stream may be processed by the decoder circuitry 208 to reconstruct the first image block from the bit-stream. The decoded first image block may exhibit significantly reduced compression artifacts, which may be apparent from an improved visual quality of the reconstructed first image block. The decoder circuitry 208 may have pre-stored quantization tables and coding tables that may act as a reference for the decoder circuitry 208 to decode the bit-stream of encoded first image block. In some embodiments, the decoder circuitry 208 may be a hardware encoder chip that may be implemented based on one of ASIC, programmable logic devices (PLDs), SOC, FPGA, digital signal processors (DSPs) or other specialized circuitries. In other embodiments, the decoder circuitry 208 may be implemented as a combination of hardware and stored set of instructions in the on-chip memory 204 (for example, instructions based on VHDL or HDL logic).

In operation, the processor 106 may be configured to partition the input image frame stored in the external memory 110 (or the on-chip memory 204) into the plurality of image blocks. Of the plurality of image blocks, a first image block may be retrieved from the external memory 110 (or the on-chip memory 204) by the encoder circuitry 206. In some cases, the retrieval of the first image block may be based on a selection of the first image block among the plurality of image blocks. The encoder circuitry 206 may be configured to execute a pre-processing operation on the first image block of the input image frame in a pixel-domain prior to a selection of an optimal encoding mode. In certain embodiments, the first image block is represented in YCbCr color space, where the first image block is represented by a luma block (i.e. a luminance component), a chroma-U (i.e. a chrominance blue difference component), and a chroma-V block (i.e. a chrominance red difference component). In such a case, the encoder circuitry 206 may be configured to execute the pre-processing operation separately on the luma block, the chroma-U block, and the chroma-V block in the pixel-domain. The pre-processing operation may result in a selection of optimal quantization parameters (as part of an adaptive quantization scheme) and an optimal residual prediction type (e.g., All Frequency DPCM or DC only DPCM). The optimal residual prediction type may correspond to a parameter of the residual prediction scheme that may result in minimum bit-loss value for a bit-stream of encoded image block and decoded image block from such bit-stream may be visually lossless, with least effect of compression artifacts.

After the pre-processing operation, the encoder circuitry 206 may be configured to execute an encoding operation on the first image block through a first encoding mode and a second encoding mode, which may correspond to a first sequential encoding scheme and a second sequential encoding scheme, respectively. The first encoding mode and the second encoding mode may include a sequential application of a forward transform, a quantization, a residual prediction, and followed by application of an entropy coding scheme on the first image block. The entropy coding scheme may be a variable length coding (VLC) scheme or one of: a context adaptive variable length coding (CAVLC) scheme or a context adaptive binary arithmetic coding (CABAC)

scheme. Examples of the VLC scheme may include, but are not limited to, Lempel-Ziv coding, Huffman coding, arithmetic coding, exp-Golomb coding, Golomb coding, and progressive-Golomb coding.

The type of forward transform, the quantization parameters, and residual prediction types may vary between the first encoding mode and the second encoding mode. The encoder circuitry 206 may be further configured to select an optimal encoding mode from one of the first encoding mode and the second encoding mode, based on a bit-loss value from bit-streams generated by the first encoding mode and the second encoding mode. The pre-processing operation has been described in detail herein.

In the pre-processing operation, the encoder circuitry 206 may be configured to generate a first prediction block based on a row-wise application of a residual prediction scheme on the first image block. The encoder circuitry 206 may be further configured to generate a second prediction block based on a column-wise application of the residual prediction scheme on the first image block. The residual prediction scheme may be at least one of: a differential pulse code modulation (DPCM) scheme, an adaptive DPCM scheme, or a PCM scheme.

In an exemplary embodiment, the first prediction block may correspond to a horizontal DPCM block of residual pixel values and the second prediction block may correspond to a vertical DPCM block of residual pixel values. The first prediction block may be generated based on a difference between each pair of consecutive pixel values in each row of pixels of the first image block. Similarly, the second prediction block may be generated based on a difference between each pair of consecutive pixel values in each column of pixels of the first image block.

The encoder circuitry 206 may be further configured to set specific residual values of the first prediction block and the second prediction block, based on a corresponding pixel value in the image block. For example, DPCM residual values for all blue pixels may be set to "0" in the horizontal prediction block and the vertical prediction block. The encoder circuitry 206 may be further configured to compute a first SAD from the first prediction block of row-wise residual values and a second SAD from the second prediction block of column-wise residual values in the pixel-domain. The first prediction block and the second prediction block may correspond to the first image block. The first SAD and the second SAD may represent an absolute sum of differences (i.e. residual values in pixel-domain) in the first prediction block and the second prediction block. Also, the first SAD and the second SAD may be indicative of a measure of spatial complexity of the input image block in terms of stronger edges along different scanning directions (or scan orders), for example, row-wise horizontal scan from left to right or column-wise vertical scan from top to bottom.

The encoder circuitry 206 may be further configured to determine optimal parameters for the residual prediction scheme that may be applied in the first encoding mode and the second encoding mode on the first image block. The optimal parameters may include a residual predication type parameter, which may specify a portion of quantized-transformed levels that may be processed based on the residual prediction scheme. The encoder circuitry 206 may be configured to select a residual prediction type from a set of residual prediction types, as an optimal residual prediction type for each of the first encoding mode and the second encoding mode. The set of residual prediction types may include, but are not limited to, a DC only DPCM type and an All Frequency DPCM type. The optimal residual prediction type may correspond to a parameter of the residual prediction scheme that may result in minimum bit-loss value for a bit-stream of encoded image block and decoded image block from such bit-stream may be visually lossless, with least effect of compression artifacts. The selection of the residual prediction type may depend on a type of forward transform, such as a first type of forward transform and a second type of forward transform specified in the first encoding mode and the second encoding mode, respectively. Thereafter, the selection of the residual prediction type may be based on the computed first SAD and the computed second SAD.

In an exemplary embodiment, the first type of forward transform may be 1D column DCT for the first encoding mode. The encoder circuitry 206 may be further configured to check, for the first encoding mode, whether the computed first SAD is greater than or equal to the computed second SAD. The residual prediction type may be the All Frequency DPCM type when the computed first SAD is greater than or equal to the computed second SAD. Otherwise, the residual prediction type may be the DC Only DPCM type when the computed first SAD is less than the computed second SAD.

In the DC only DPCM type, the encoder circuitry 206 may be configured to apply the DPCM scheme only on the DC quantized-transformed levels for the first image block. The remaining AC quantized-transformed residual levels may remain unaffected after the application of the DPCM scheme. Similarly, in the All Frequency DPCM type, all the quantized-transformed residual levels (which includes DC and AC levels) may be subjected under the DPCM scheme.

In an exemplary embodiment, the second type of forward transform may be 1D row DCT for the second encoding mode. In such a case, the encoder circuitry 206 may be configured to determine an offset parameter for a luma block and a pair of chroma blocks (i.e. chroma-U and chroma-V components) of the first image block, in accordance with a specific bit-depth for the luma block and the pair of chroma blocks. The specific bit-depth may be a target bit-depth for the encoded luma or chroma block. The offset parameter may correspond to an adaptive offset value that may be indicative of an offset of luma block values from chroma block values. The value of the offset parameter may be further determined based on the target bit-depth for the luma block and the pair of chroma blocks. The value of offset parameter may be initialized by "0" for the pair of chroma blocks irrespective of the target bit-depth and the value of the offset parameter may be a non-zero value for the luma block.

An example of different values for the offset parameter for different target bit-depths has been given in Table 1, as follows:

TABLE 1

Offset values for different block types

| Block Type | Original Bit-Depth (bps) | Target Bit-Depth (bps) | Offset Value |
| --- | --- | --- | --- |
| Luma | 8 | 4 | 35 |
|  | 8 | 6 | 75 |
| Chroma | 8 | 4 | 0 |
|  | 8 | 6 | 0 |

In Table 1, the value of offset parameter is "0" for the pair of chroma blocks irrespective of a target bit-depth. The non-zero value for the luma block is "35" for a bit-depth of "4 bps" (bits per sample) and "75" for a bit-depth of "6 bps".

Here, the original bit-depth represents a number of bits that are used to represent a chrominance component or a luma component of the first image block. The target bit-depth represents a number of bits that may be required to encode the same chrominance component or the luma component in order to achieve a desired compression ratio within a preferred bit-budget.

The encoder circuitry 206 may be further configured to check, for the second encoding mode, whether the computed first SAD is less than or equal to a sum of the computed second SAD and the determined offset parameter. In an exemplary embodiment, the residual prediction type may be an All Frequency DPCM type when the computed first SAD is less than or equal to the sum of the computed second SAD and the determined offset parameter. Otherwise, the residual prediction type may be the DC Only DPCM type when the computed first SAD is greater than the sum of the computed second SAD and the determined offset parameter.

The encoder circuitry 206 may be further configured to determine a minimum SAD value based on a comparison of the computed first SAD with the computed second SAD. Thereafter, it may be checked whether the determined minimum SAD value is less than a threshold value. The selection of a set of quantization parameters for each of the first encoding mode and the second encoding mode may be based on the check to determine whether the determined minimum SAD value is less than a threshold value. The threshold value may vary based on a block type (i.e. different for luma component and chroma component) and a target bit-depth.

An example of different threshold values for different block types for selection of the set of quantization parameters is given in Table 2, as follows:

TABLE 2

Threshold values for different block types

| Block Type | Original Bit-Depth (bps) | Target Bit-Depth (bps) | Threshold Value |
|---|---|---|---|
| Luma | 8 | 4 | 525 |
|  | 8 | 6 | 525 |
| Chroma | 8 | 4 | 250 |
|  | 8 | 6 | 300 |

In Table 2, the threshold value for a target bit-depth of "4 bps" and "6 bps" and a block type of luma is set as "525" and the threshold value for a target bit-depth of "4 bps" and "6 bps" and a block type of chroma is set as "250" and "300", respectively.

The encoder circuitry 206 may be configured to select the set of quantization parameters as optimal quantization parameters for each of the first encoding mode and the second encoding mode. The set of quantization parameters for each of the first encoding mode and the second encoding mode may be selected based on a comparison of the minimum SAD value with the threshold value. The specific values of quantization parameters may be further determined from a DCT type, a block type, and a target bit-depth for the first encoding mode and the second encoding mode. An example of different sets of quantization parameters for different target bit-depths and different block types is given in Table 3, as follows:

TABLE 3

Different sets of quantization parameters for different target bit-depths and different block types

| Target Bit-Depth (bps) | Block Type | DCT Type | $QN_0$ | $QN_1$ | $QN_2$ | $QN_3$ |
|---|---|---|---|---|---|---|
| 4 | Luma | Row DCT | 2 | 4 | 5 | 6 |
|  |  | Column DCT | 3 | 4 | 5 | 6 |
|  | Chroma | Row DCT | 2 | 3 | 4 | 5 |
|  |  | Column DCT | 1 | 2 | 3 | 4 |
| 6 | Luma | Row DCT | 2 | 4 | 5 | 6 |
|  |  | Column DCT | 1 | 3 | 4 | 5 |
|  | Chroma | Row DCT | 2 | 3 | 4 | 5 |
|  |  | Column DCT | 1 | 2 | 3 | 4 |

From Table 3, the set of quantization parameters for first encoding mode and the second encoding mode may include different combinations of three different quantization parameters among the four given quantization parameters ($QN_0$, $QN_1$, $QN_2$, and $QN_3$) in the Table 3. For example, when the minimum SAD for the first encoding mode and the second encoding mode is less than the threshold value, the set of quantization parameters may be selected either from (a) a combination of $QN_0$, $QN_1$, and $QN_2$, or (b) a combination of $QN_1$, $QN_2$, and $QN_3$, in an example. The specific values of quantization parameters may be further determined from a DCT type, a block type, and a target bit-depth for the first encoding mode and the second encoding mode, as given in Table 3.

The computation of the first SAD and the second SAD and the selection of the residual prediction type and the set of quantization parameters corresponds to the pre-processing operation associated with the first image block in the pixel-domain. The pre-processing operation is executed prior to an encoding operation, where different sequential encoding schemes are applied on the first image block in transform-domain. Herein, application of different sequential encoding schemes through different encoding modes on the first image block is described.

After the pre-processing operation, in some embodiments, the encoder circuitry 206 may be further configured to apply, in the first encoding mode, a first sequential encoding scheme on the first image block to generate a first bit-stream from a set of bit-streams of encoded first image block. The first bit-steam may be generated based on the selected residual prediction type and the selected set of quantization parameters for the first encoding mode. The first sequential encoding scheme may include sequential application of a first type of forward transform (e.g., 1D row DCT), a quantization, a residual prediction (e.g., DPCM scheme), and an entropy coding scheme. Also, the encoder circuitry 206 may be configured to apply, in the second encoding mode, a second sequential encoding scheme on the first image block to generate a second bit-stream of the set of bit-streams of encoded first image block. The second bit-steam may be generated based on the selected residual prediction type and the selected set of quantization parameters for the second encoding mode. The second sequential encoding scheme may include a sequential application of a second type of forward transform (e.g., 1D column DCT), a quantization, a residual prediction (e.g., DPCM scheme), and an entropy coding scheme.

In order to select a best encoding mode from the first encoding mode and the second encoding mode, the encoder circuitry 206 may be further configured to compute a first set of bit-loss values and a second set of bit-loss values from the set of bit-streams of the encoded first image block. The first set of bit-loss values and the second set of bit-loss values may be computed for the first encoding mode and the second encoding mode, respectively. In accordance with an embodiment, the bit-loss value may be computed from a bit-coverage value for each of the set of bit-streams. In such a case, the bit-loss value may be a difference in a total number of bits for a bit-stream minus the bit-coverage value for the corresponding bit-stream. The bit-coverage value may represent a number of bits for all samples in the first image block encoded losslessly in the first encoding mode or the second encoding mode. Similarly, the bit-loss value may represent a number of bits in a bit-stream corresponding to a set of samples of the first image block encoded in a lossy manner. Thus, both the bit-coverage value and the bit-loss value may represent a measure of coding quality, which is used to decide an optimal encoding mode from the first encoding mode and the second encoding mode.

In accordance with an embodiment, the encoder circuitry 206 may be configured to scale the first set of bit-loss values and the second set of bit-loss values from the set of bit-streams of the encoded first image block. The scaling may be done to ensure that a comparison between bit-loss values for the first encoding mode and bit-loss values for the second encoding mode can be done on a normalized scale. More specifically, even when input bit-depth for the first image block is same for the first encoding mode and the second encoding mode, the operating bit-depth for the encoded first image block (after the entropy coding stage) may (or may not) differ with respect to the first encoding mode and the second encoding mode. For example, for an input bit-depth of "8" bits per sample (bps), the operating bit-depth for the encoded first image block through the first encoding mode and the second encoding mode may be "6 bps" and "4 bps", respectively. Thus, every sample in the encoded first image block, via the first encoding mode and the second encoding mode, may be represented by "6 bits" and "4 bits", respectively. For an equitable comparison, the encoder circuitry 206 may be configured to scale the first set of bit-loss values and the second set of bit-loss values from the set of bit-streams of the encoded first image block.

Thereafter, one of the first encoding mode or the second encoding mode may be selected by the encoder circuitry 206 as the best encoding mode for the first image block. The best encoding mode may correspond to an encoding mode through which an image block may be encoded with a minimal bit-loss value and reconstruction/decoding of image block from encoded image block may lead to generation of a visually lossless image block. The selection may be done based on the computed first set of bit-loss values and the computed second set of bit-loss values. Alternatively stated, the encoding mode for which the total bit-loss value is least is selected as the best encoding mode. The encoder circuitry 206 may be further configured to apply, through the best encoding mode, the optimal sequential encoding scheme on the first image block to generate a bit-stream of encoded image block. The functions and/or operations executed by the EBC circuitry 108, as described in FIGS. 1 and 2, have been further described in detail, for example, in FIGS. 3A and 3B.

Figure 3A:
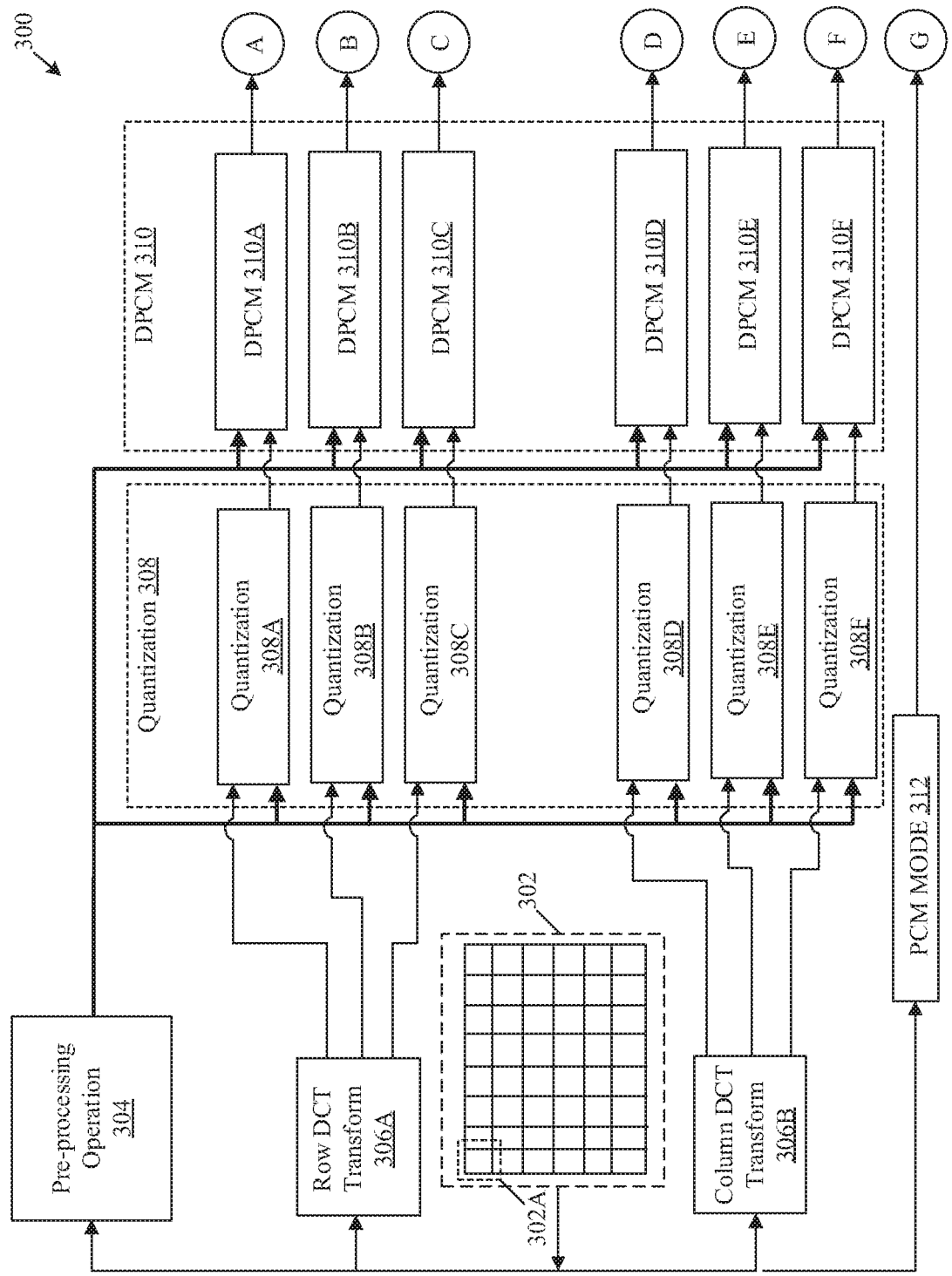
FIGS. 3A and 3B, collectively, illustrate an exemplary scenario for image block coding by the EBC circuitry of FIG. 2, based on pixel-domain pre-processing operations on image block, in accordance with an embodiment of the disclosure.
Figure 3B:
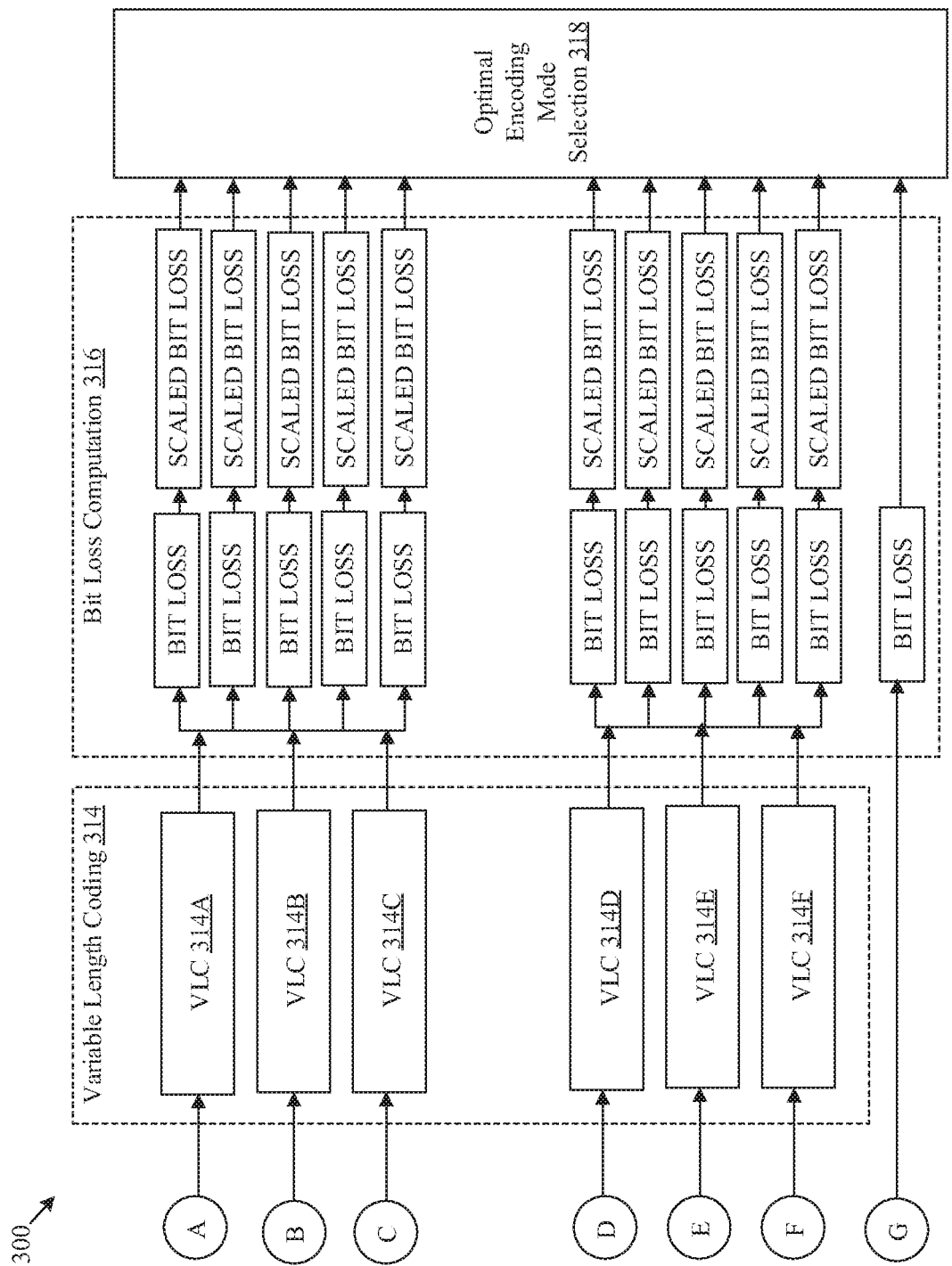

FIGS. 3A and 3B, collectively, illustrate an exemplary scenario for image block coding by the EBC circuitry of FIG. 2, based on pixel-domain pre-processing operations on image block, in accordance with an embodiment of the disclosure. FIGS. 3A and 3B are explained in conjunction with elements from FIG. 1 and FIG. 2.

At 304, a pre-processing operation may be executed on a first image block 302A of the input image frame 302 in the pixel domain. The encoder circuitry 206 may be configured to execute a pre-processing operation to select an encoding mode from a first encoding mode and a second encoding mode as an optimal encoding mode to encode the first image block 302A into a bit-stream of encoded first image block. Each encoding mode may include a forward transform operation, a quantization operation, a residual prediction operation (e.g., DPCM operation), and an entropy coding operation.

At 306A, a first transform block of a first image block 302A may be generated. The encoder circuitry 206 may be configured to generate a first transform block from the first image block 302A, by application of the first type of forward transform (such as the 1D row DCT) on the first image block 302A.

At 306B, a second transform block of the first image block 302A may be generated. The encoder circuitry 206 may be configured to generate the second transform block from the first image block 302A, by application of the second type of forward transform (such as 1D column DCT) on the first image block 302A.

At 308, the first transform block and the second transform block may be quantized. The encoder circuitry 206 may be configured to quantize the first transform block and the second transform block to generate a first block of quantized-transformed levels and a second block of quantized-transformed levels. The quantization may be done based on each of the set of quantization parameters determined for the first encoding mode and the second encoding mode. The quantization operation at 308A, 308B, and 308C may be executed on the transform block obtained after application of row DCT transform at 306A. The encoder circuitry 206 may be configured to quantize the second transform block to generate a second set of quantized transform blocks, based on each of the second set of quantization parameters determined for the second type of forward transform. The quantization operation at 308D, 308E, and 308F may be executed on the transform block obtained after application of column DCT transform at 308A.

At 310, the first block of quantized-transformed levels and the second block of quantized-transformed levels may be transformed into a first block of quantized-transformed residual levels and a second block of quantized-transformed residual levels. The transformation may be caused by application of the optimum DPCM scheme on the first block of quantized-transformed levels and the second block of quantized-transformed levels. The encoder circuitry 206 may be configured to apply the optimal DPCM scheme on the first block of quantized-transformed levels and the second block of quantized-transformed levels to generate the first block of quantized-transformed levels and the second block of quantized-transformed levels. The application of DPCM operation may be executed at 310A, 310B, and 310C on the first block of quantized-transformed levels and at 310D, 310E, and 310F on the second block of quantized-transformed levels.

At 312, a plurality of pixel-domain residual values may be computed based on application of the PCM scheme on the first image block 302A. The encoder circuitry 206 may be configured to compute a plurality of pixel-domain residual values based on application of the PCM scheme on the first image block 302A.

At 314, the first block of quantized-transformed residual levels and the second block of quantized-transformed residual levels may be entropy encoded. The encoder circuitry 206 may be configured to entropy encode the first block of quantized-transformed residual levels and the second block of quantized-transformed residual levels to generate a set of bit-streams of the encoded first image block.

The first bit-stream may be generated based on application of entropy coding scheme on the first block of quantized-transformed residual levels at 314A, 314B, and 314C. Similarly, the second bit-stream may be generated based on application of entropy coding scheme on the second block of quantized-transformed residual levels at 314D, 314E, and 314F. The entropy coding scheme may be a variable length coding (VLC) scheme or one of: a context adaptive variable length coding (CAVLC) scheme or a context adaptive binary arithmetic coding (CABAC) scheme. Examples of the VLC scheme may include, but are not limited to, Lempel-Ziv coding, Huffman coding, arithmetic coding, exp-Golomb coding, Golomb coding, and progressive-Golomb coding.

At 316, a first set of bit-loss values and a second set of bit-loss values may be computed for the first bit-stream and the second bit-stream, respectively. The encoder circuitry 206 may be configured to compute the first set of bit-loss values and the second set of bit-loss values for the first bit-stream and the second bit-stream, respectively.

At 318, an optimal encoding mode is selected from the first encoding mode and the second encoding mode. The encoder circuitry 206 may be configured to select the optimal encoding mode from the first encoding mode and the second encoding mode, based on a computation of bit-loss values of each of the first bit-stream and the second bit-stream, as discussed in FIGS. 1 and 2. The best encoding mode may correspond to an encoding mode through which an image block may be encoded with a minimal bit-loss value and reconstruction/decoding of image block from encoded image block may lead to generation of a visually lossless image block.

Figure 4A:
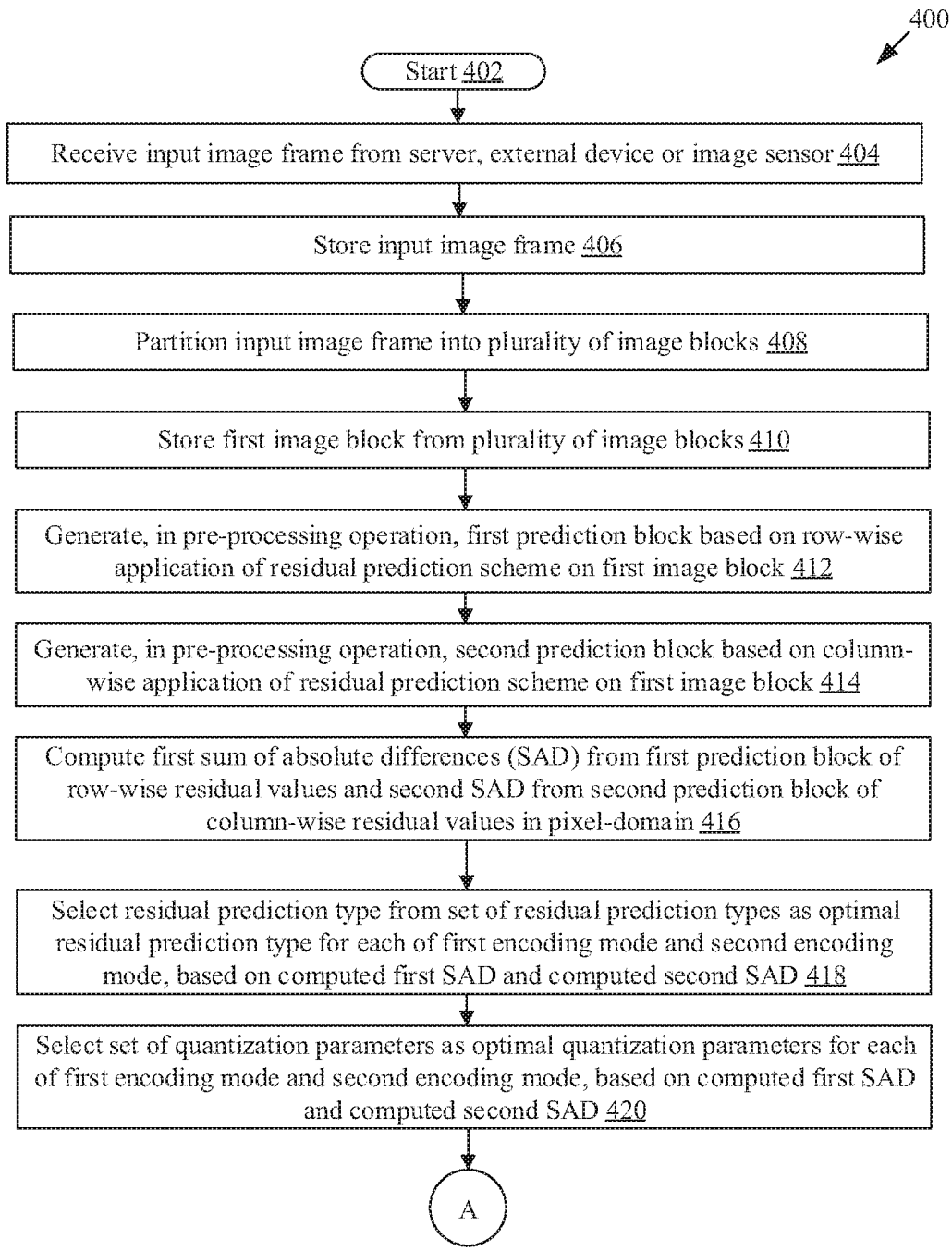
FIGS. 4A and 4B, collectively, depict a flowchart that illustrates exemplary operations for image block coding based on pixel-domain pre-processing operations on image block, in accordance with an embodiment of the disclosure.
Figure 4B:
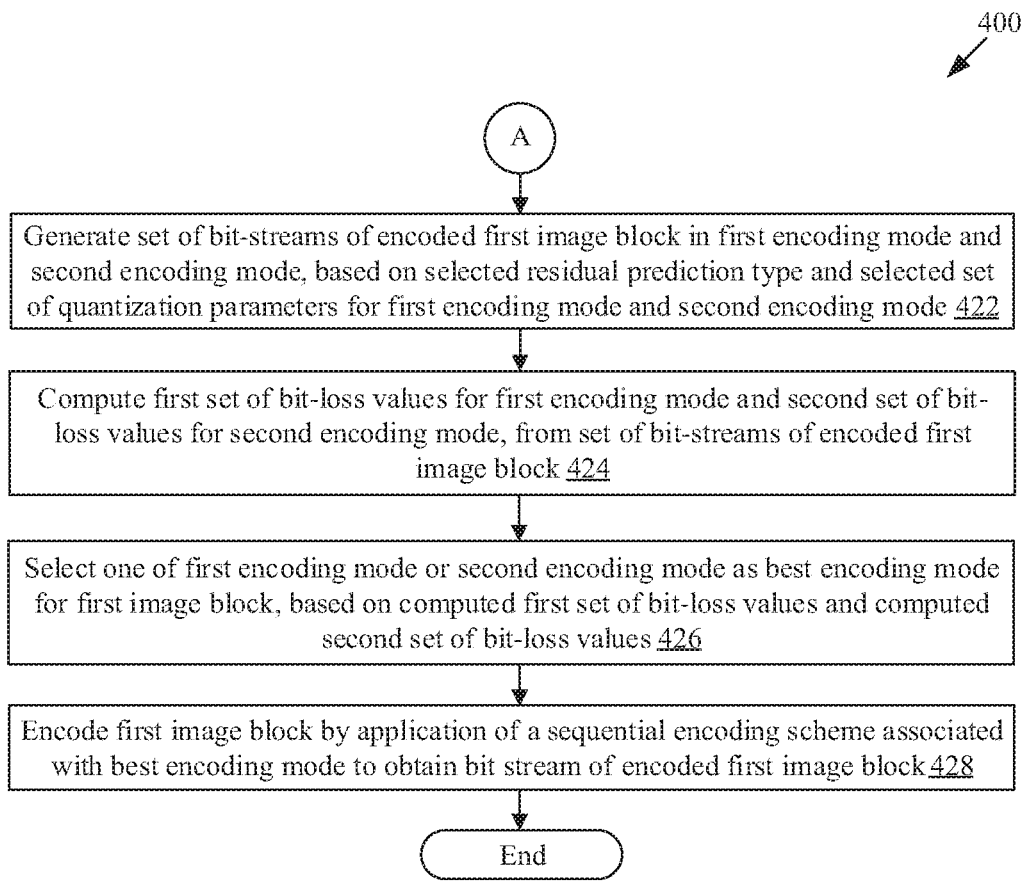

FIGS. 4A and 4B, collectively, depict a flowchart that illustrates exemplary operations for image block coding based on pixel-domain pre-processing operations on image block, in accordance with an embodiment of the disclosure. With reference to FIG. 4, there is shown a flowchart 400. The flowchart 400 is described in conjunction with, for example, FIGS. 1, 2, 3A and 3B. The operations, implemented at the EBC circuitry 108, starts at 402 and proceeds to 404.

At 404, an input image frame may be received from a server, external device, or the image sensor 104. The EBC circuitry 108 may be configured to receive the input image frame from a server, an external device, or the image sensor 104. For example, the input image frame may be an image frame of a video. In certain scenarios, the input image frame may be an image captured by an image-capture device associated with the media device 102.

At 406, the input image frame may be stored. The on-chip memory 204 or the external memory 110 may be configured to store the input image frame, as discussed in FIG. 1.

At 408, the input image frame may be partitioned into a plurality of image blocks, each of which includes plurality of pixel values. The EBC circuitry 108 may be configured to partition the input image frame into the plurality of image blocks, as discussed in FIG. 1.

At 410, a first image block of the plurality of image blocks may be stored. The on-chip memory 204 or the external memory 110 may be configured to store the first image block of the plurality of image blocks.

At 412, a first prediction block may be generated in the pre-processing operation based on row-wise application of a residual prediction scheme on the first image block. The encoder circuitry 206 may be configured to generate, in the pre-processing operation, the first prediction block in the pre-processing operation, based on row-wise application of a residual prediction scheme on the first image block.

At 414, a second prediction block may be generated in the pre-processing operation based on column-wise application of a residual prediction scheme on the first image block. The encoder circuitry 206 may be configured to generate, in the pre-processing operation, the second prediction block in the pre-processing operation, based on column-wise application of a residual prediction scheme on the first image block.

At 416, a first SAD from the first prediction block of row-wise residual values and a second SAD from the second prediction block of column-wise residual values may be computed in the pixel-domain. The encoder circuitry 206 may be configured to compute the first SAD from the first prediction block of row-wise residual values and the second SAD from the second prediction block of column-wise residual values, in the pixel-domain.

At 418, a residual prediction type may be selected from a set of residual prediction types as an optimal residual prediction type for each of a first encoding mode and a second encoding mode, based on the computed first SAD and the computed second SAD. The encoder circuitry 206 may be configured to select a residual prediction type from the set of residual prediction types as the optimal residual prediction type for each of the first encoding mode and the second encoding mode, based on the computed first SAD and the computed second SAD. The optimal residual prediction type may correspond to a parameter of the residual prediction scheme that may result in minimum bit-loss value for a bit-stream of encoded image block and decoded image block from such bit-stream may be visually lossless, with least effect of compression artifacts.

At 420, a set of quantization parameters may be selected as optimal quantization parameters for each of the first encoding mode and the second encoding mode, based on the computed first SAD and the computed second SAD. The encoder circuitry 206 may be configured to select a set of quantization parameters as the optimal quantization parameters for each of the first encoding mode and the second encoding mode, based on the computed first SAD and the computed second SAD.

At 422, a set of bit-streams of encoded first image block may be generated in the first encoding mode and the second encoding mode, based on selected residual prediction type and selected set of quantization parameters for each of the first encoding mode and the second encoding mode. The encoder circuitry 206 may be configured to generate a set of bit-streams of encoded first image block in the first encoding mode and the second encoding mode, based on selected residual prediction type and selected set of quantization parameters for each of the first encoding mode and the second encoding mode.

At 424, a first set of bit-loss values for the first encoding mode and a second set of bit-loss values for the second encoding mode may be computed from the bit-streams of first encoded image block. The encoder circuitry 206 may be configured to compute the first set of bit-loss values for the first encoding mode and the second set of bit-loss values for the second encoding mode from the bit-streams of first encoded image block.

At 426, one of the first encoding mode or the second encoding mode may be selected as the best encoding mode for the first image block, based on the computed first set of bit-loss values and the second set of bit-loss values. The encoder circuitry 206 may be configured to select one of the first encoding mode or the second encoding mode as the best encoding mode for the first image block, based on the computed first set of bit-loss values and the second set of bit-loss values.

At 428, the first image block may be encoded by application of a sequential encoding scheme in the selected optimal encoding mode to obtain a bit-stream of encoded first image block. The encoder circuitry 206 may be configured to encode the first image block by application of a sequential encoding scheme in the selected optimal encoding mode to obtain a bit-stream of encoded first image block. Control passes to end.

Various embodiments of the disclosure may provide a non-transitory, computer readable medium and/or storage medium, and/or a non-transitory machine readable medium and/or storage medium stored thereon, a machine code and/or a computer program with at least one code section executable by a machine and/or a computer for compressing digital image data. The at least one code section may cause the machine and/or computer to perform the steps that comprise storage of a first image block of a plurality of image blocks of an input image frame. A computation of a first sum of absolute differences (SAD) from a first prediction block of row-wise residual values and a second SAD from a second prediction block of column-wise residual values in pixel-domain. The first prediction block and the second prediction block may correspond to the first image block. A selection of a residual prediction type from a set of residual prediction types as an optimal residual prediction type for each of a first encoding mode and a second encoding mode. The residual prediction type may be selected based on the computed first SAD and the computed second SAD. In some embodiments, the set of residual prediction types may include a DC only DPCM type and an All Frequency DPCM type. Also, a selection of a set of quantization parameters as optimal quantization parameters for each of the first encoding mode and the second encoding mode. The set of quantization parameters for each of the first encoding mode and the second encoding mode may be selected based on the computed first SAD and the computed second SAD. A generation of a set of bit-streams of encoded first image block in the first encoding mode and the second encoding mode, respectively. The set of bit-streams may be generated based on the selected residual prediction type and the selected set of quantization parameters for the first encoding mode and the second encoding mode.

Certain embodiments of the disclosure may be found in an embedded codec (EBC) circuitry. Various embodiments of the disclosure may provide the EBC circuitry that may include a memory and encoder circuitry communicatively coupled to the memory. The memory may be configured to store a first image block of a plurality of image blocks of an input image frame. The encoder circuitry may be configured to compute a first sum of absolute differences (SAD) from a first prediction block of row-wise residual values and a second SAD from a second prediction block of column-wise residual values in pixel-domain. The first prediction block and the second prediction block may correspond to the first image block. The encoder circuitry may be further configured to select a residual prediction type from a set of residual prediction types as an optimal residual prediction type for each of a first encoding mode and a second encoding mode. The residual prediction type may be selected based on the computed first SAD and the computed second SAD. In some embodiments, the set of residual prediction types may include a DC only DPCM type and an All Frequency DPCM type. Also, the encoder circuitry may be configured to further select a set of quantization parameters as optimal quantization parameters for each of the first encoding mode and the second encoding mode. The set of quantization parameters for each of the first encoding mode and the second encoding mode may be selected based on the computed first SAD and the computed second SAD. The encoder circuitry may be configured to generate a set of bit-streams of encoded first image block in the first encoding mode and the second encoding mode, respectively. The set of bit-streams may be generated based on the selected residual prediction type and the selected set of quantization parameters for the first encoding mode and the second encoding mode.

In accordance with an embodiment, the encoder circuitry may be further configured to partition the input image frame into the plurality of image blocks. Each image block may include a plurality of pixel values. In accordance with an embodiment, the computation of the first SAD and the second SAD and the selection of the residual prediction type and the set of quantization parameters corresponds to a pre-processing operation associated with the first image block in the pixel-domain, prior to an application of a sequential encoding scheme on the first image block in transform-domain.

In accordance with an embodiment, the encoder circuitry may be further configured to generate, in the pre-processing operation, the first prediction block based on a row-wise application of a residual prediction scheme on the first image block. The encoder circuitry may be further configured to generate, in the pre-processing operation, the second prediction block based on a column-wise application of the residual prediction scheme on the first image block. The residual prediction scheme may be at least one of: a differential pulse code modulation (DPCM) scheme, an adaptive DPCM scheme, or a PCM scheme. In accordance with an embodiment, the first prediction block may correspond to a horizontal DPCM block of residual pixel values and the second prediction block may correspond to a vertical DPCM block of residual pixel values.

In accordance with an embodiment, the encoder circuitry may be further configured to check, for the first encoding mode, whether the computed first SAD is greater than or equal to the computed second SAD. The residual prediction type may be an All Frequency DPCM type when the computed first SAD is greater than or equal to the computed second SAD. The residual prediction type may be a DC Only DPCM type when the computed first SAD is less than the computed second SAD.

In accordance with an embodiment, the first image block may be represented as at least a luma block and a pair of chroma blocks in YCbCr color space. The encoder circuitry may be further configured to determine an offset parameter for the luma block and the pair of chroma blocks in accordance with a specific bit-depth for the luma block and the pair of chroma blocks. The encoder circuitry may be further configured to check, for the second encoding mode, whether the computed first SAD is less than or equal to a sum of the computed second SAD and the determined offset parameter. The residual prediction type may be an All Frequency DPCM type when the computed first SAD is less than or equal to the sum. Otherwise, the residual prediction type may a DC Only DPCM type when the computed first SAD is greater than the sum.

In accordance with an embodiment, the encoder circuitry may be further configured to determine a minimum SAD value based on a comparison of the computed first SAD with the computed second SAD. Thereafter, it may be checked whether the determined minimum SAD value is less than a threshold value. The selection of the set of quantization parameters for each of the first encoding mode and the second encoding mode may be based on the check.

In accordance with an embodiment, the encoder circuitry may be further configured to apply, after the pre-processing operation, a first sequential encoding scheme on the first image block to generate a first bit-stream in the first encoding mode, from the set of bit-streams of encoded first image block. The first bit-steam may be generated based on the selected residual prediction type and the selected set of quantization parameters for the first encoding mode. In accordance with an embodiment, the first sequential encoding scheme may include a sequential application of a first type of forward transform, a quantization, a residual prediction, and an entropy coding scheme. The first type of forward transform may be 1D row DCT.

In accordance with an embodiment, the encoder circuitry may be further configured to apply, after the pre-processing operation, a second sequential encoding scheme on the first image block to generate a second bit-stream in the second encoding mode, from the set of bit-streams of encoded first image block. The second bit-steam may be generated based on the selected residual prediction type and the selected set of quantization parameters for the second encoding mode. The second sequential encoding scheme may include a sequential application of a second type of forward transform, a quantization, a residual prediction, and an entropy coding scheme. The second type of forward transform may be 1D column DCT.

In accordance with an embodiment, the encoder circuitry may be further configured to compute a first set of bit-loss values for the first encoding mode and a second set of bit-loss values for the second encoding mode, from the set of bit-streams of the encoded first image block. Thereafter, one of the first encoding mode or the second encoding mode may be selected by the encoder circuitry as a best encoding mode for the first image block. The selection may be done based on the computed first set of bit-loss values and the computed second set of bit-loss values.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An embedded codec (EBC) circuitry, comprising:
   a memory to store a first image block of a plurality of image blocks of an input image frame; and
   encoder circuitry, wherein the encoder circuitry is configured to:
      compute a first sum of absolute differences (SAD) from a first prediction block of row-wise residual values and a second SAD from a second prediction block of column-wise residual values in pixel-domain, wherein the first prediction block and the second prediction block corresponds to the first image block;
      select a residual prediction type from a set of residual prediction types as an optimal residual prediction type for each of a first encoding mode and a second encoding mode, based on the computed first SAD and the computed second SAD;
      select a set of quantization parameters as optimal quantization parameters for each of the first encoding mode and the second encoding mode, based on the computed first SAD and the computed second SAD; and
      generate a set of bit-streams of encoded first image block in the first encoding mode and the second encoding mode, based on the selected residual prediction type and the selected set of quantization parameters for the first encoding mode and the second encoding mode.

2. The EBC circuitry according to claim 1, wherein
   the encoder circuitry is further configured to partition the input image frame into the plurality of image blocks, and
   each image block comprises a plurality of pixel values.

3. The EBC circuitry according to claim 1, wherein the computation of the first SAD and the second SAD and the selection of the residual prediction type and the set of quantization parameters corresponds to a pre-processing operation associated with the first image block in the pixel-domain, prior to an application of a sequential encoding scheme on the first image block in transform-domain.

4. The EBC circuitry according to claim 1, wherein the encoder circuitry is further configured to generate, in a pre-processing operation, the first prediction block based on a row-wise application of a residual prediction scheme on the first image block.

5. The EBC circuitry according to claim 4, wherein the encoder circuitry is further configured to generate, in the pre-processing operation, the second prediction block based on a column-wise application of the residual prediction scheme on the first image block.

6. The EBC circuitry according to claim 5, wherein the residual prediction scheme is at least one of a differential pulse code modulation (DPCM) scheme, an adaptive DPCM scheme, or a PCM scheme.

7. The EBC circuitry according to claim 1, wherein the first prediction block corresponds to a horizontal DPCM block of residual pixel values and the second prediction block corresponds to a vertical DPCM block of residual pixel values.

8. The EBC circuitry according to claim 1, wherein the encoder circuitry is further configured to check, for the first encoding mode, whether the computed first SAD is greater than or equal to the computed second SAD.

9. The EBC circuitry according to claim 8, wherein the residual prediction type is an All Frequency DPCM type when the computed first SAD is greater than or equal to the computed second SAD.

10. The EBC circuitry according to claim 8, wherein the residual prediction type is a Direct Current (DC) Only DPCM type when the computed first SAD is less than the computed second SAD.

11. The EBC circuitry according to claim 1, wherein the set of residual prediction types comprises a DC only DPCM type and an All Frequency DPCM type.

12. The EBC circuitry according to claim 1, wherein the first image block is represented as at least a luma block and a pair of chroma blocks in YCbCr color space.

13. The EBC circuitry according to claim 12, wherein the encoder circuitry is further configured to determine an offset parameter for the luma block and the pair of chroma blocks in accordance with a specific bit-depth for the luma block and the pair of chroma blocks.

14. The EBC circuitry according to claim 13, wherein the encoder circuitry is further configured to check, for the second encoding mode, whether the computed first SAD is less than or equal to a sum of the computed second SAD and the determined offset parameter.

15. The EBC circuitry according to claim 14, wherein the residual prediction type is an All Frequency DPCM type when the computed first SAD is less than or equal to the sum.

16. The EBC circuitry according to claim 14, wherein the residual prediction type is a DC Only DPCM type when the computed first SAD is greater than the sum.

17. The EBC circuitry according to claim 1, wherein the encoder circuitry is further configured to:
  determine a minimum SAD value based on a comparison of the computed first SAD with the computed second SAD; and
  check whether the determined minimum SAD value is less than a threshold value.

18. The EBC circuitry according to claim 1, wherein the selection of the set of quantization parameters for each of the first encoding mode and the second encoding mode is based on the check.

19. The EBC circuitry according to claim 1, wherein
  the encoder circuitry is further configured to apply, after a pre-processing operation, a first sequential encoding scheme on the first image block to generate a first bit-stream in the first encoding mode, from the set of bit-streams of encoded first image block, and
  the first bit-steam is generated based on the selected residual prediction type and the selected set of quantization parameters for the first encoding mode.

20. The EBC circuitry according to claim 19, wherein
  the first sequential encoding scheme comprises a sequential application of a first type of forward transform, a quantization, a residual prediction, and an entropy coding scheme, and
  the first type of forward transform is a one dimensional row discrete cosine transform (1D row DCT).

21. The EBC circuitry according to claim 1, wherein
  the encoder circuitry is further configured to apply, after a pre-processing operation, a second sequential encoding scheme on the first image block to generate second bit-stream in the second encoding mode, from the set of bit-streams of encoded first image block, and
  the second bit-steam is generated based on the selected residual prediction type and the selected set of quantization parameters for the second encoding mode.

22. The EBC circuitry according to claim 21, wherein the second sequential encoding scheme comprises a sequential application of a second type of forward transform, a quantization, a residual prediction, and an entropy coding scheme, and wherein the second type of forward transform is a 1D column DCT.

23. The EBC circuitry according to claim 1, wherein the encoder circuitry is further configured to:
  compute a first set of bit-loss values for the first encoding mode and a second set of bit-loss values for the second encoding mode, from the set of bit-streams of the encoded first image block; and
  select one of the first encoding mode or the second encoding mode as a best encoding mode for the first image block, based on the computed first set of bit-loss values and the computed second set of bit-loss values.

24. A method, comprising:
  in embedded codec (EBC) circuitry that comprises a memory and encoder circuitry:
    storing, by the memory, a first image block of a plurality of image blocks of an input image frame; and
    computing, by the encoder circuitry, a first sum of absolute differences (SAD) from a first prediction block of row-wise residual values and a second SAD from a second prediction block of column-wise residual values in pixel-domain, wherein the first prediction block and the second prediction block corresponds to the first image block;
    selecting, by the encoder circuitry, a residual prediction type from a set of residual prediction types as an optimal residual prediction type for each of a first encoding mode and a second encoding mode, based on the computed first SAD and the computed second SAD;
    selecting, by the encoder circuitry, a set of quantization parameters as optimal quantization parameters for each of the first encoding mode and the second encoding mode, based on the computed first SAD and the computed second SAD; and
    generating, by the encoder circuitry, a set of bit-streams of encoded first image block in the first encoding mode and the second encoding mode, based on the selected residual prediction type and the selected set of quantization parameters for the first encoding mode and the second encoding mode.

* * * * *